US012592789B2

(12) United States Patent
Butler et al.

(10) Patent No.: US 12,592,789 B2
(45) Date of Patent: Mar. 31, 2026

(54) HYBRID CLOCKING SCHEME FOR TRANSMITTING PACKETIZED AUDIO AND POWER OVER A COMMON CONDUCTOR

(71) Applicant: Dolby Laboratories Licensing Corporation, San Francisco, CA (US)

(72) Inventors: Joel Butler, Springfield, MO (US); Jeremy Sommerfeld, Nixa, MO (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 552 days.

(21) Appl. No.: 18/248,522

(22) PCT Filed: Oct. 7, 2021

(86) PCT No.: PCT/US2021/053960
§ 371 (c)(1),
(2) Date: Apr. 10, 2023

(87) PCT Pub. No.: WO2022/081412
PCT Pub. Date: Apr. 21, 2022

(65) Prior Publication Data
US 2023/0403091 A1     Dec. 14, 2023

Related U.S. Application Data

(60) Provisional application No. 63/090,397, filed on Oct. 12, 2020.

(30) Foreign Application Priority Data

Oct. 12, 2020     (EP) ..................................... 20201279

(51) Int. Cl.
*H04J 3/06*          (2006.01)
*H04B 3/54*          (2006.01)

(52) U.S. Cl.
CPC .............. *H04J 3/0661* (2013.01); *H04B 3/54* (2013.01)

(58) Field of Classification Search
CPC ........ H04B 3/54; H04J 3/0635; H04J 3/0655; H04J 3/0661; H04J 3/0682; H04J 3/54
See application file for complete search history.

(56)                References Cited

U.S. PATENT DOCUMENTS

2004/0006484 A1     1/2004  Manis
2005/0015805 A1     1/2005  Iwamura
                    (Continued)

FOREIGN PATENT DOCUMENTS

JP          2018513621 A      5/2018
WO           03042858 A1      5/2003
                    (Continued)

OTHER PUBLICATIONS

Henry Mickael et al: "Setup and First Experimentation Over an AES67 Over 802.11 Network", JAES, AES, 60 East 42nd Street, Room 2520, New York 10165-2520, USA, Mar. 10, 2019 (Mar. 10, 2019), 5 Pages.

(Continued)

*Primary Examiner* — Brian P Cox

(57)                ABSTRACT

A distributed amplification and packetized audio transmission system for clock synchronization and alignment between an audio/power source and endpoints with dedicated amplifiers and speakers. An Ethernet audio signal is combined with a Power-Line Communications (PLC) signal for transmission from the source to the endpoints over a common conductor. A single master clock in the source synchronizes the Ethernet audio transmitter with the PLC transmitter. Each end-point has a PLC receiver to recover the master clock for use by its Ethernet audio receiver to provide reliable clock synchronization between the source clock and the endpoint clocks. The endpoints can adjust and re- (Continued)

600 timestamp the PTP packetized clock based upon symbol and timing information from the PLC receiver.

14 Claims, 7 Drawing Sheets

(56)             References Cited

U.S. PATENT DOCUMENTS

| | | | |
|---|---|---|---|
| 2006/0072695 A1 | 4/2006 | Iwamura | |
| 2012/0038826 A1 | 2/2012 | Logvinov | |
| 2014/0247892 A1 | 9/2014 | Williams | |
| 2015/0326279 A1* | 11/2015 | Schneider | H04L 27/26 |
| | | | 375/257 |
| 2017/0273044 A1 | 9/2017 | Alsina | |
| 2018/0077491 A1 | 3/2018 | Butler | |

FOREIGN PATENT DOCUMENTS

| | | | |
|---|---|---|---|
| WO | 2014040667 A1 | 3/2014 | |
| WO | 2016160876 A1 | 10/2016 | |
| WO | 2018005895 A1 | 1/2018 | |
| WO | 2018071239 A1 | 4/2018 | |

OTHER PUBLICATIONS

IEEE 1588 Precision Time Protocol, first version, Oct. 6, 2020, pp. 1-10, 10 pages, https://web.archive.org/web/20201006160109/https://en.wikipedia.org/wiki/Precision_Time_Protocol.

Wikipedia AES 67 Technical Standard, Jul. 11, 2020, pp. 1-10, 10 pages, https://web.archive.org/web/20200711183310/https://en.wikipedia.org/wiki/AES67.

Wikipedia G.hn, Oct. 3, 2020, pp. 1-13, 13 pages, https://web.archive.org/web/20201003091640/https:/en.wikipedia.org/wiki/G.hn.

Wikipedia, CobraNet, Jul. 8, 2020, pp. 1-10, 10 pages, https://web.archive.org/web/20200708070748/https://en.wikipedia.org/wiki/CobraNet.

Wikipedia, Homeplug, Versions, Homeplug AV2, Sep. 24, 2020, pp. 1-8, 8 pages, https://web.archive.org/web/20200924222126/https://en.wikipedia.org/wiki/HomePlug.

Wikipedia, IEEE 1901 Technical Standard, Oct. 10, 2020, pp. 1-6, 6 pages, https://web.archive.org/web/20201010171823/https:/en.wikipedia.org/wiki/IEEE_1901.

* cited by examiner

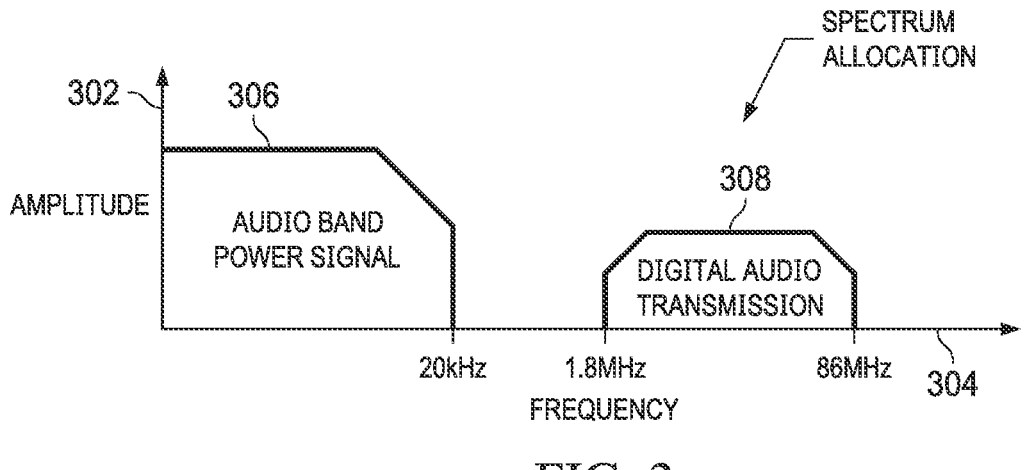

302

306

SPECTRUM ALLOCATION

AMPLITUDE

AUDIO BAND POWER SIGNAL

308

DIGITAL AUDIO TRANSMISSION

20kHz    1.8MHz    86MHz    304
FREQUENCY

602    PROVIDE SINGLE MASTER CLOCK IN ETHERNET TRANSMITTER OF SOURCE SIDE

604    USE MASTER CLOCK TO SYNCHRONIZE ETHERNET TRANSMITTER WITH PLC OF SOURCE SIDE

606    TRANSMIT SYNCHRONIZED PLC TO END-POINT USING COMMON CONDUCTOR

608    USE END-POINT PLC DEMODULATOR TO RECOVER AND LOCK TO MASTER CLOCK

610    SEND RECOVERED MASTER CLOCK TO ETHERNET AUDIO RECEIVER OF THE END-POINT

USE PLC TELEMETRY INFORMATION TO ALIGN THE RECOVERED CLOCK EDGE TIMING WITH THE AUDIO SAMPLE STREAM

802 — END-POINT RECEIVES PLC SIGNAL FROM SOURCE SIDE

804 — END POINT PLC MEASURES AND PROVIDES SYMBOL LATENCY AND JITTER PERFORMANCE

806 — ADJUST OR RE-TIMESTAMP EACH PTP PACKET TO ACCOMMODATE FOR PLC TIME-VARYING LATENCY AND JITTER

808 — END-POINT ETHERNET RECEIVER USES PTP CLOCK SYNCHRONIZATION TO SYNC END-POINT CLOCK TO SOURCE CLOCK

HYBRID CLOCKING SCHEME FOR TRANSMITTING PACKETIZED AUDIO AND POWER OVER A COMMON CONDUCTOR

CROSS REFERENCE TO RELATED APPLICATIONS

This application is a U.S. National Stage of International Application No. PCT/US2021/053960, filed Oct. 7, 2021, which claims priority to European Patent Application No. 20201279.5, filed 12 Oct. 2020 and U.S. provisional application 63/090,397, filed 12 Oct. 2020, each of which is hereby incorporated by reference in its entirety.

TECHNICAL FIELD

Embodiments relate to audio systems, and more specifically to clock synchronization for transmitting digital audio and power over common a conductor.

BACKGROUND

The transmission of digital audio data via the Ethernet has long been a subject of discussion and development in the audio industry. The most common present approach is that defined in the AES67 standard, which defines audio over Internet Protocol (IP) and audio over Ethernet (AoE) interoperability. This approach provides mechanisms to transmit the audio sample streams and the audio clocking to recover, decode, and time align the samples at an audio end-point. To establish a reliable technique for synchronizing the audio clocks via Ethernet, AES67 utilizes the IEEE1588 standard for Precision Time Protocol (PTP) packets. This technique is a packetized clock format wherein the end-points (slaves) can receive specific PTP packets and ultimately synchronize to the master clock that was originated in the master transmitter. The AES67 standard, and similar methods, rely upon Ethernet packets to transmit and receive clocking information such that the end-points (slaves) can synchronize to the master clock.

Along with AoE development, Power-Line Communication (PLC) technology has also evolved considerably over the past decade and today has reliably demonstrated 1 Gigabit data transmission performance over standard AC mains power line infrastructure. The basic approach used by PLC devices is to transmit digital data using multiple frequencies positioned well-above the base-band power transmission spectrum. Thus, the two transmissions paths, one power path and one digital data path, can coexist on the same power line or loudspeaker cable infrastructure. PLC technology relies on digital communication practices such as Orthogonal Frequency Division Multiplexing (OFDM) and Bi-Polar Phase Shift Keying (BPSK) to transmit the digital data on a basic two-conductor power line. Such techniques fundamentally require synchronization between the master transmitter and the downstream end-point (slaves). Thus, present PLC standards (e.g., Homeplug AV2, ITU-T, G.Hn and IEEE1901-2010) require robust mechanisms for establishing clock synchronization between transmit and receive nodes residing on the power line bus.

In general, the AES67 approach does not perform well when subjected to latent or jittery Ethernet packets, which is the case when passing such packets through PLC devices. Thus, systems that use packet-based clock synchronization schemes, such as AES67 are not reliable when passing through PLC transmission and reception infrastructure.

SUMMARY OF EMBODIMENTS

Embodiments include a distributed amplification and packetized audio transmission system for clock synchronization and alignment between an audio/power source and a plurality of endpoints with dedicated amplifiers and speakers. An Ethernet audio signal is combined with a Power-Line Communications (PLC) signal for transmission from the source to the endpoints over a common conductor. A single master clock in the source synchronizes the Ethernet audio transmitter with the PLC transmitter. Each end-point has a PLC receiver to recover the master clock for use by its Ethernet audio receiver to provide reliable clock synchronization between the source clock and the endpoint clocks. The transmitted PLC signal could comprise Precision Time Protocol (PTP) packets, and the endpoints could adjust and re-timestamp the PTP packetized clock based upon symbol and timing information from PLC receiver.

Embodiments also include a distributed amplifier audio speaker system having an audio source transmitting audio and power over a common conductor to a plurality of end-points, each having a speaker to playback the audio. The audio source may be an Ethernet audio transmitter coupled to a power line communication (PLC) transmitter and a master clock coupled to and generating a master clock signal for both the Ethernet audio transmitter and PLC transmitter. The PLC transmitter is configured to generate a PLC encoded signal comprising the audio to the plurality of endpoints. Each end-point comprises a PLC receiver coupled to an Ethernet receiver coupled to a speaker and receives the PLC encoded signal. It recovers the master clock signal from the PLC encoded signal to synchronize the Ethernet receiver to the Ethernet transmitter.

BRIEF DESCRIPTION OF THE DRAWINGS

In the following drawings like reference numbers are used to refer to like elements. Although the following figures depict various examples, the one or more implementations are not limited to the examples depicted in the figures.

FIG. 3 illustrates an example spectrum allocation for power and audio signals transmitted over the same conductors, under some embodiments.

FIG. 6 is a flowchart that illustrates a method of providing end-point audio clock synchronization through PLC clocking system, under some embodiments.

DETAILED DESCRIPTION

Embodiments are directed to systems and methods for clock synchronization for transmitting digital audio over base-band power lines or speaker cables in audio playback systems. Any of the described embodiments may be used alone or together with one another in any combination. Although various embodiments may have been motivated by various deficiencies with the current and known solutions, which may be discussed in the specification, the embodiments do not necessarily address any of these deficiencies. Different embodiments may address different deficiencies, and some may only be partially addressed.

Distributed Amplification Speaker System

Developments in transmitting packetized digital audio data over power line and loudspeaker cabling for the past few years has led to systems that greatly simplify wiring, improve fidelity and performance, lower cost. One such development is a distributed amplification or "drive-pack" system in which multi-channel digital audio data and power signals are present on the speaker wiring routed to each drive-packs located at each speaker. These drive-packs can demodulate and decode the desired audio channel and recover the power signal, which will then be used to drive their respective loudspeaker. In an embodiment, this technology relies on concepts of power-line communications (PLC) technology to establish a reliable digital data link between the master transmitter and downstream receivers. Power transmission and recovery are established using audio-band signals and modulation techniques. The overall aim of this system is to create a loudspeaker amplification and drive system wherein a single cable can daisy-chain between multiple loudspeakers, yet each speaker can play unique content material.

Figure 1:
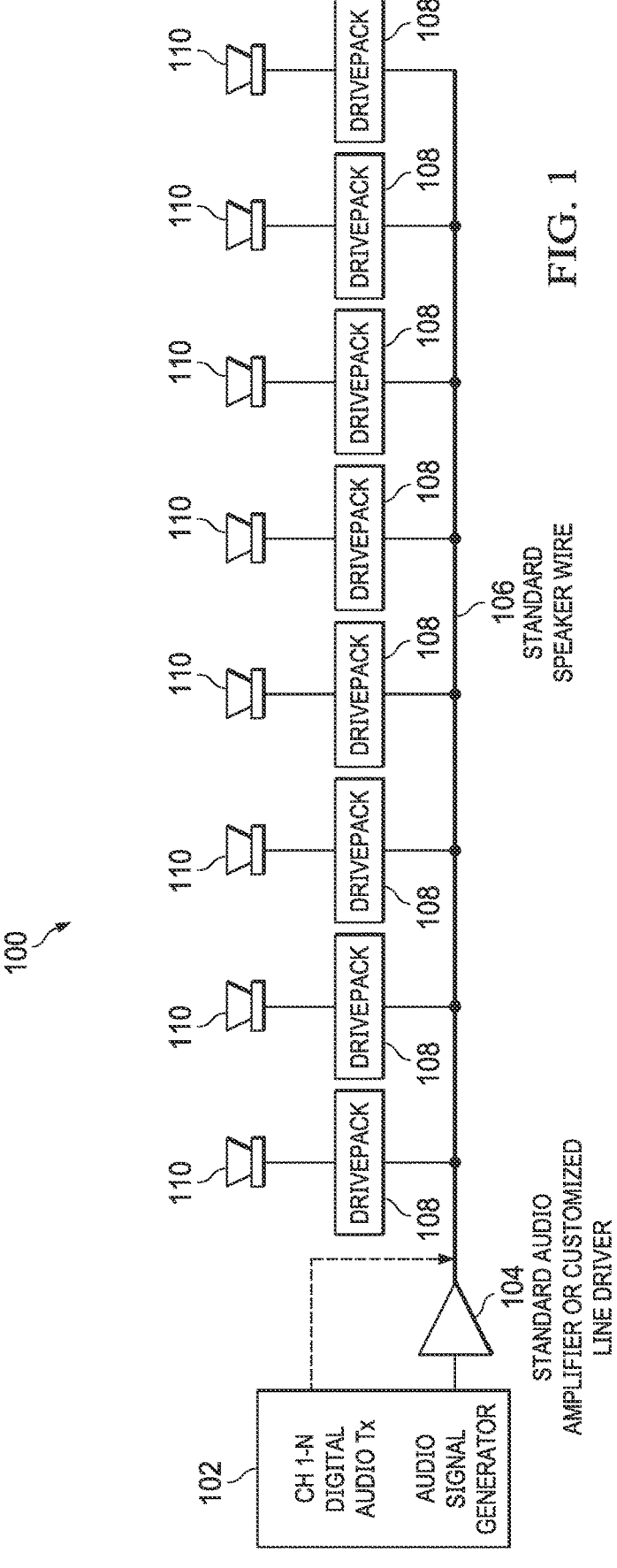
FIG. 1 illustrates a distributed amplification (drive-pack) speaker system that implements one or more embodiments of a clock synchronization scheme for transmitting digital audio over base-band power lines.

FIG. 1 illustrates a distributed amplifier speaker system that implements one or more embodiments of a clock synchronization scheme for transmitting digital audio and power over common base-band power lines or speaker cables. As shown in FIG. 1, system 100 is a multi-channel speaker system with any number, N, of speakers 110. Instead of having one amplifier and one power supply and separate dedicated cabling per speaker channel as in traditional speaker hookups, system 100 features one main amplifier and associated control unit 102, one cable run ("bus") 106, and one power supply 104 for all of the N speaker channels 110. To attain this simplification in the power and signal distribution infrastructure, each speaker channel has associated with it a dedicated speaker unit 108, referred to as a "drivepack," that receives and recovers the power and audio signal that is generated by the control unit 102. The number N channels can be any practical number of channels dictated by the system requirements. For a standard surround sound setup, N may be 7 or 9, while for a full spatial audio (e.g., Dolby Atmos®) system with height speakers, N can be on the order of 16 or 24 channels or more.

The architecture of system 100 allows for audio power and signal to be distributed to multiple loudspeakers without the use of high channel-count amplifiers and multiple point-to-point cables, thus reducing the number of audio power amplifier channels and the number of independent loudspeaker cables, while still allowing each loudspeaker to have independent drive (i.e., separate audio signals present at each loudspeaker). In an embodiment, amplifier 104 is a power supply that may be implemented as a customized or standard audio amplifier to transmit a power signal over the bus 106, and control unit 102 comprises an N-channel digital audio transceiver and an audio signal generator that adds a digital audio signal onto the same bus cable.

A digital audio transceiver of unit 102 transmits multiple digital audio streams in as driven by the power signal generated by the audio amplifier 104. These two signal streams (power and data) are transmitted simultaneously through bus 106 and are received by small electronic speaker units 108 built in (or closely coupled) to each loudspeaker 110. The speaker units 108 recover the power, receive the digital audio stream, and drive the loudspeakers with the selected signals. In one embodiment, the bus cable 106 is a single standard two-conductor speaker cable of standard gauge (e.g., 10-20 gauge) and can be used to send multiple channels of digital audio and appropriate power to independent loudspeakers connected to the same two-conductor cable. That is, many speakers can be wired in a daisy-chained or parallel fashion while still allowing independent channels of audio to be played at each speaker (i.e., different signals and volumes). The bus cable may be implemented as a simple two-conductor speaker cable or a three-conductor cable, such as an AC power cable where one conductor is an earth ground, or any other similar simple conductor cable. Instead of traditional speaker cable (i.e., stranded wire cable), a solid-core Romex (typical AC wiring cable) cable might be used as well.

In an embodiment, portions of power source 104 may be implemented as a standard power amplifier. This may also or instead be implemented as a dedicated base-band AC or DC power source, similar to an audio amplifier but with much higher power efficiency and power throughput. For this embodiment, the system would be highly suitable for maximum power transmission, minimized power loss, and lowest cost.

The loudspeakers 110 may represent a single driver or transducer within a single enclosure (cabinet), or a multi-driver loudspeaker with different transducers handling different audio components (e.g., woofer, midrange, tweeter), or arrays of speakers. In an embodiment, the speaker units 108 can also include additional circuitry to drive each speaker component independently (e.g., woofer, tweeter, etc.) in a bi-amplification system. Both the control unit and each speaker unit include a transceiver stage allowing for bidirectional data flow between the digital audio transceiver of the control unit and the multiple speakers residing on the bus. Thus, other pieces of information can be propagated to-and-from the loudspeaker. For example, a loudspeaker could report telemetry (e.g., down-angle, temperature, etc.), and/or setup information could be sent to individual speakers (e.g., volume control, angle adjustment for motorized pan-tilt, and so on). In systems utilizing bi-amplification within the speaker, derivation of two (or more) audio signals can be done by sending the speaker unit 108 a single audio stream, wherein the speaker unit employs signal processing to derive two (or more) audio signals from a single input stream. The control unit 102 may also send the multiple streams directly to the individual amplification stages within the speaker unit 108.

Figure 2:
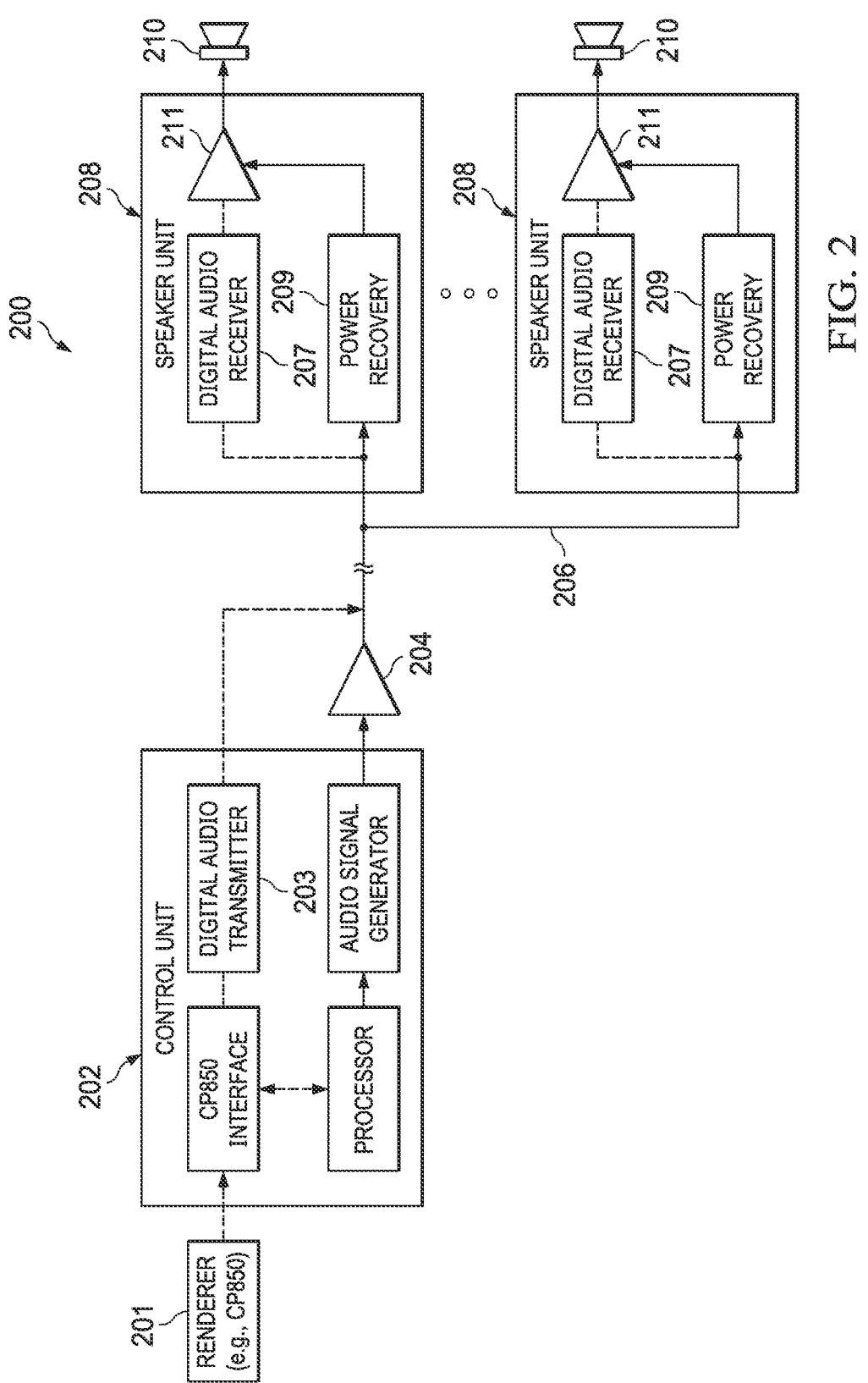
FIG. 2 illustrates components of control and speaker units for the distributed amplification system of FIG. 1 under some embodiments.

FIG. 2 illustrates components of control and speaker units for the distributed amplification system of FIG. 1 under some embodiments. The architecture of the system 200 subdivides the audio amplification process such that the power supply is physically separated from the individual output stages and is chosen such that it effectively supplies an AC stimulus to power multiple output stages.

In an embodiment, power source 204 comprises a standard audio amplifier to provide power for other distributed audio output stages. This helps achieve an efficiency through component reuse by eliminating one of the largest cost drivers in any audio amplifier design, i.e., the power supply. An audio power amplifier is typically designed as an AC-DC power supply, feeding into one or more low-impedance, transistorized, output stages. Most audio amplifiers are designed as two to four-channel devices, wherein there is a singular power supply (AC/DC offline supply) fanning out to power the output stages. The power supply can thus be implemented as a standard audio amplifier that develops a controlled, audio-band, AC waveform, and provide regulatory compliance (e.g., NRTL, CE, FCC, safety isolation, etc.).

For the embodiment of FIG. 2, the modulating input waveform applied to the power source audio amplifier is generated by an audio signal generator in control unit 202. Because the output of the power source amplifier is used only for distributing power to the various output stages, no significant fidelity or spectral-purity requirement is imposed upon this power amplifier. Similar to the signals present on typical AC mains (120 Vrms, 60 Hz); the power source audio amplifiers would generate an AC waveform configured to power downstream distributed audio output stages. This allows an existing audio amplifier to serve as the power source for a distributed array of output stages, and a single cable 206 can power multiple output stages 210. As with any paralleled power distribution system, the overall power consumption would have to be adequately determined and managed, such that the power source amplifier and cabling could adequately deliver the power as needed by the sum total of all distributed output stages connected to the line. In cases where more power is needed, or a greater number of paralleled output stages are attached to the line, the power source amp could be bridged or paralleled with a like amplifier. An example power supply may be a cinema-grade amplifier (e.g., Crown DSi2000) that delivers 800 W per channel into 4 ohms or 1000 W per channel into 2 ohms, or any similarly rated amplifier.

As shown in system 200, the control unit 202 generates digital audio signals that comprises immersive audio having both channel-based and object-based audio components. For the example of FIG. 2, an interface couples the control unit 202 to a renderer (e.g., CP850) 201, for example. This interface and processor provide the signal to an audio signal generator that stimulates the power source 204. A digital audio transmitter 203 of the control unit 202 outputs the digital audio signal directly to the output of the power source so that both power and the digital audio signal are carried on the bus cable 206. The control unit also includes appropriate circuitry that conditions the power and data to endure that they are properly transmitted over the bus in terms of timing, amplitude, and phase.

Although embodiments are illustrated with respect to immersive or adaptive audio applications, it should be noted that any appropriate audio format may be used, and that, depending on the type of interface provided in control unit 202, the input audio may be straight digital audio, hybrid audio, pure channel-based audio, pure object-based audio, and so on. In the case where analog audio is provided, the system may include an integrated or separate analog-digital converter to provide the digital audio signal to stimulate the power supply 204 and provide digital audio input to the bus cable 206. In an embodiment, the control unit 202 outputs digital data primarily to be coupled into the output of the power source, and input to the power source is stimulated with an analog audio-band modulation signal (i.e., sine wave, pink-noise, summed audio signal, etc.). Thus, digital data is primarily routed/coupled to the output of the power source, whereas the input to the power source can be controlled via digital or analog techniques.

In an embodiment in which the power source 204 comprises a standard or other type of amplifier, the system 200 can be configured to create power stimulus signals into the amplifier as well as having a line connected to the output of the amplifier to inject the digital data stream onto the speaker wire or bus cable 206. The digital data stream wire can also be used as a sense line for the controller through an A/D (analog/digital) circuit. The controller 202 can then compare the input and output signals coming from the respective amplifier channel. This allows additional features to be implemented in the software (or equivalent circuitry) such as gain modification adjustment (e.g., if the user changes the amplifier gain, the system can adjust the input signal to compensate), fault monitoring for distortion, fault monitoring for signal present, automated system configuration to alter gain structure, and other similar functions.

In an embodiment, the bus cable 206 that links the control unit 202 to each of the speaker units 208 is a single two-conductor speaker cable (or three-conductor power cable or similar). Data is transmitted over the bus using Internet Protocol (IP) conventions, though other protocols are also possible. A standard power-line communication format is utilized to provide sufficient bandwidth and channel separation to allow the channelized audio information produced by the control unit to be delivered to the output stages. Examples of standard power-line communication protocol include IEEE 1901 (HomePlug AV 1.1) and the G.hn protocol. It should be noted that embodiments are not so limited, and other standardized protocols, or proprietary techniques for transmitting digital audio information over power source cabling to deliver independent audio streams to distributed output stages are also possible.

The power signal, digital audio signal and metadata for audio object control and lighting control are transmitted over the same conductor between the control unit/amplifier and the speaker units, and are encoded in different bands of the frequency spectrum. The power and audio signals may be separated by frequency band. For example, the power component may be relegated to a relatively low frequency band of between 0 (DC) and 20 kHz, while the digital data component for the audio and lighting control may be carried in a band stretching between 1 MHz to 100 MHz, as an example, though embodiments are not so limited. FIG. 3 illustrates an example spectrum allocation for power and audio signals transmitted over the same conductors, under some embodiments. The spectrum allocation graph shows the amplitude (y-axis) 302 of signals versus their frequency (x-axis) 304. As shown in FIG. 3, the audio band power signal is encoded in the region of 0 to 20 kHz, while the digital audio transmission is encoded in the region of 1.8 MHz to 86 MHz. The separation of the power 306 and audio 308 signals is thus on the order of greater than 1.5 MHz. FIG. 3 illustrates an example power/audio spectrum allocation and embodiments are not so limited, as any other similar spectrum allocation may also be utilized to encode audio signals for transmission over common conductors.

Figure 4:
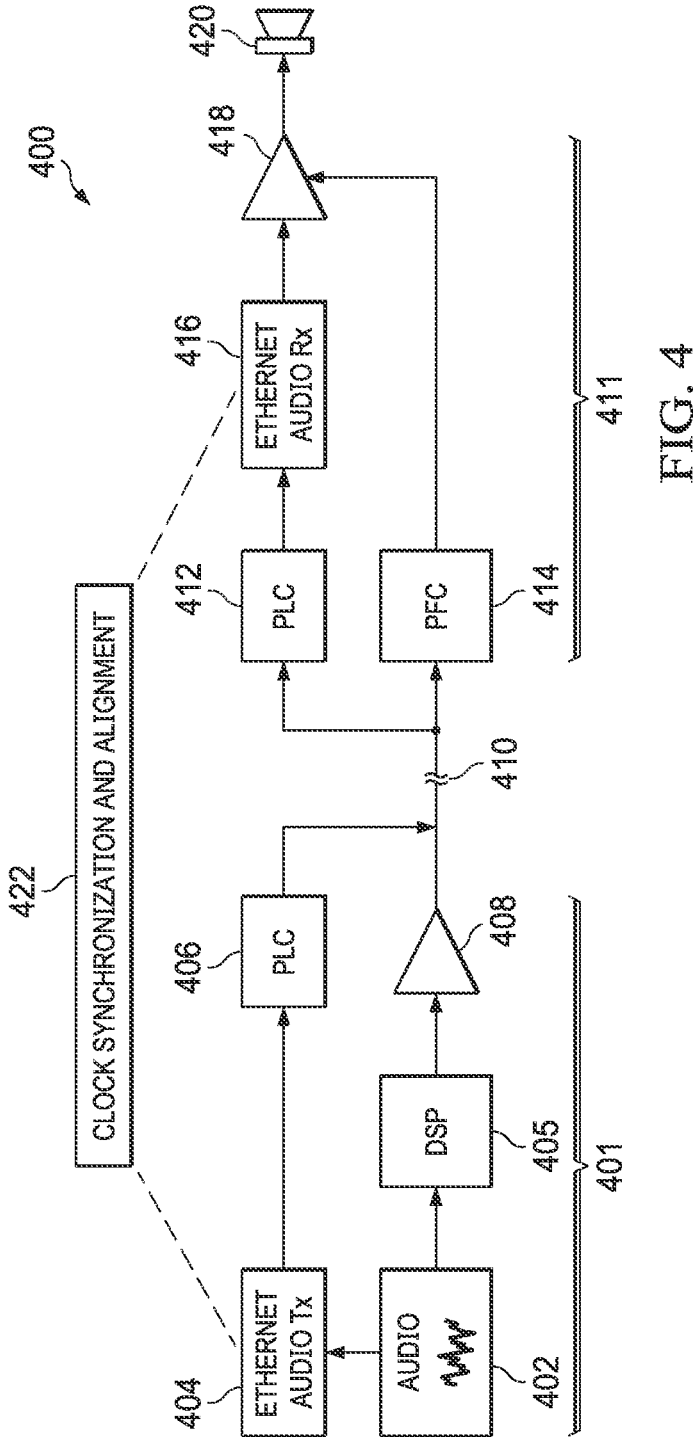
FIG. 4 illustrates the distributed amplifier system of FIG. 1 as implemented using standard off-the-shelf components, under an example embodiment.

FIG. 4 illustrates the distributed amplifier system of FIG. 1 as implemented using standard, commercially available components, under an example embodiment. For system 400, audio and power signals are propagated between a source 401 and an endpoint 411 through certain electrical components per a specific sequence and over a common conductor 410. Audio signals are originated from the audio block 402 of source 401. The audio is then packetized into an Ethernet audio format (e.g., either AES67 or CobraNet)

using an audio transmitter (e.g., Dolby CP850, Audio Science Hono 8.0L, or similar) 404. The packetized audio is then sent to a Power-Line Communications (PLC) transmitter 406, which is coupled to the output of a base-band power source (e.g., Crown amplifier) 408. Amplifier 408 is driven by the audio signal from source 402 processed by a digital signal process (DSP) 405. The amplifier 408 then outputs a power supply signal to be conducted via a standard two-conductor loudspeaker wiring, or other similar conductor or cable 410 to the end-point electronics located at or closely coupled to the loudspeaker 420. The power supply signal output from the amplifier 408 and the packetized audio output from the PLC transmitter 406 are combined at the electrically coupled outputs of the PLC transmitter 406 and amplifier 408.

Within the end-point 411, a Power-Line Communication (PLC) receiver 412 is coupled to the inbound speaker wiring 410 and operable to demodulate and recover the Ethernet packets. The recovered Ethernet packets are then passed to an Ethernet audio receiver 416, which recovers the audio stream that originated from the original audio source 402. The recovered audio is then amplified using a standard or customized Class-D amplifier 418 for driving the loudspeaker transducer 420. Amplifier 418 also receives as an input the composite signal transmitted over conductor 410 as conditioned or converted by a Power Factor Correction (PFC) component 414.

FIG. 4 is provided only for the purpose of illustrating an example implementation of a distributed amplifier speaker system that includes or is modified to include a clock synchronization process. Such an example circuit is not intended to be limiting, and other implementations, components, configurations, and signal processing sequences are also possible.

As described previously, certain issues may exist with present PLC systems with respect to establishing reliable audio transmission from the audio source 402 to the end-point audio receiver 416. The PLC transmission and reception process can add latency and jitter to the packetized digital information and resulting in decoding errors within the end-point. Of specific concern is the impact of the randomized PLC latency and jitter upon the packetized audio clocking infrastructure that is inherently embedded into the Ethernet audio schemes employed in certain audio over Ethernet systems. The PLC latency and jitter can adversely affect the reliable recovery and synchronization of the audio clocking information that is packetized within certain AoE streams, thus leading to poor transmission of Ethernet packetized audio streams through standard PLC devices. Specifically, it has been determined that certain latency and jitter added by the PLC transmission and reception process to the packetized digital information can result in decoding errors within the end-point 411.

Embodiments thus include a clock synchronization and alignment component or system 422 that helps achieve satisfactory transmission of Ethernet packetized audio streams through standard PLC devices and common conductors (e.g., speaker wires).

As shown in FIG. 4, a distributed amplifier audio transmission and speaker playback system incorporates a clock synchronization and alignment component 422 to help achieve clock synchronization and alignment for use with packetized audio transmissions over base-band power lines or speaker cables. This component or processes embodied therein helps solve the issues associated with poor clock synchronization when transmitting standardized audio packets using power-line communication devices.

Master Clock Synchronization Method

Figure 5:
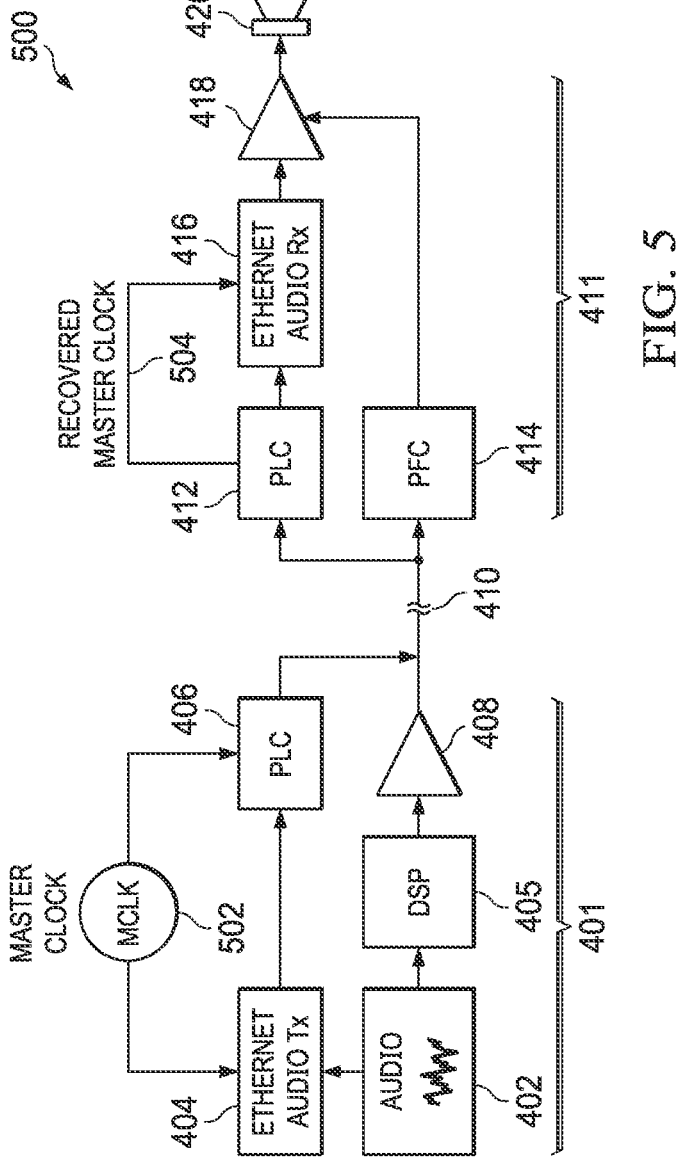
FIG. 5 illustrates adding end-point audio clock synchronization through power line communication (PLC) clocking to the distributed amplifier system of FIG. 4, under some embodiments.

FIG. 5 illustrates adding end-point audio clock synchronization through PLC clocking to the distributed amplifier system of FIG. 4, under some embodiments. The approach of system 500 uses a hybrid combination of the two communication layers (e.g., AES67 and PLC) to provide a stable and reliable clock synchronization scheme for audio transmission over base-band power-lines. System 500 comprises a source circuit 401 with the audio source generating packetized Ethernet signals for transmission over conductor 410 to end-point 411 for playback through speaker 420, as described above with respect to FIG. 4. For this embodiment, the clock synchronization and alignment component 422 is embodied by clock circuit 502 for source 401 and clock circuit 504 for end-point 411.

For the embodiment of FIG. 5, a singular master clock 502 is employed within the main transmitter, where this master clock synchronizes the Ethernet audio transmitter 404 with the PLC modulator 406. Subsequently, the downstream end-point 411 utilizes the PLC demodulation receiver 412 to recover and lock to the original master clock 502 and then feeds this synchronized clock to the Ethernet audio receiver 416. This approach thus ensures reliable clock synchronization between the master transmitter and all down-stream end-points (slaves). Due to the inherent clock synchronization requirement of modern PLC transmissions utilizing OFDM and BPSK signaling, the master clock supplied to the PLC transmitter will be recovered by the downstream PLC receiver using phase-locking methods.

This clocking scheme also properly time aligns the clock edges to the inbound audio samples as recovered from the Ethernet data packets. This is accomplished by using the PLC telemetry information (received PLC symbol latency and jitter) to adequately adjust the recovered clock edge timing to align with the audio sample stream. Thus, the clocking mechanism of FIG. 5 accomplishes two goals. First, it provides clock recovery/synchronization between the source and the end-point (i.e. phase coherency is ensured between the audio source and the end-point), and second, it aligns the clock edge time with the audio sample stream. With these characteristics, reliable audio transmission can be realized using packetized audio over base-band power-line and loudspeaker cables.

FIG. 6 is a flowchart that illustrates a method of providing end-point audio clock synchronization through PLC clocking system, such as through the system of FIG. 5, under some embodiments. Process 600 begins with providing a single master clock in or with the Ethernet transmitter of the source side, 602. This master clock synchronizes the Ethernet transmitter with the PLC modulator of the source side, 604. The synchronized PLC signal is then transmitted to the end-point side over the common connector (e.g., speaker wire), 606. The PLC demodulation receiver of the end-point receives the PLC signal and recovers and locks to the original master clock, 608. This recovered original master clock signal is then provided to the Ethernet audio receiver in the end-point, 610. In this way, the master Ethernet transmitter's clock is synchronized with the Ethernet receiver of the end-point. In a speaker system with multiple (e.g., 8 to 64) speakers, this scheme ensures that the clock is reliably synchronized between the master transmitter and all of the speaker end-points.

As stated above with respect to FIG. 5, the PLC signal sent from the source to the end-point is also used to properly time align the clock edges to the inbound audio samples as recovered from the Ethernet data packets. Thus, in process 500, the transmitted synchronized PLC signal (transmitted in step 606 of flow diagram of FIG. 6) is also used to adequately adjust the recovered clock edge timing to align with the audio sample stream (aligned in step 612 of flow diagram of FIG. 6). This is done using the received PLC symbol latency and jitter (PLC telemetry data) within the received PLC signal. By monitoring the symbol-to-symbol latency, delay, and nominal jitter performance of the physical layer (i.e., the loudspeaker cabling), the PLC receiver can accurately adjust and align the audio sample framing to ensure robust recovery of the audio sample stream.

Precision Time Protocol Update Method

In another embodiment, audio clock synchronization between source and end-point can be accomplished through a PLC precision time protocol (PTP) update. The following description of this further embodiment will focus on the differences between it and the previously described embodiment. Therefore, features which are common to both embodiments will be omitted from the following description, and so it should be assumed that features of the previously described embodiment are or at least can be implemented in the further embodiment, unless the following description thereof requires otherwise.

In this embodiment, the end-point Ethernet receiver adjusts and re-timestamps the PTP packetized clock information based upon the symbol timing information known within the PLC receiver. This technique requires the end-point PLC to have accurate timing information for its inbound symbols, similar to the previously discussed embodiment.

Figure 7:
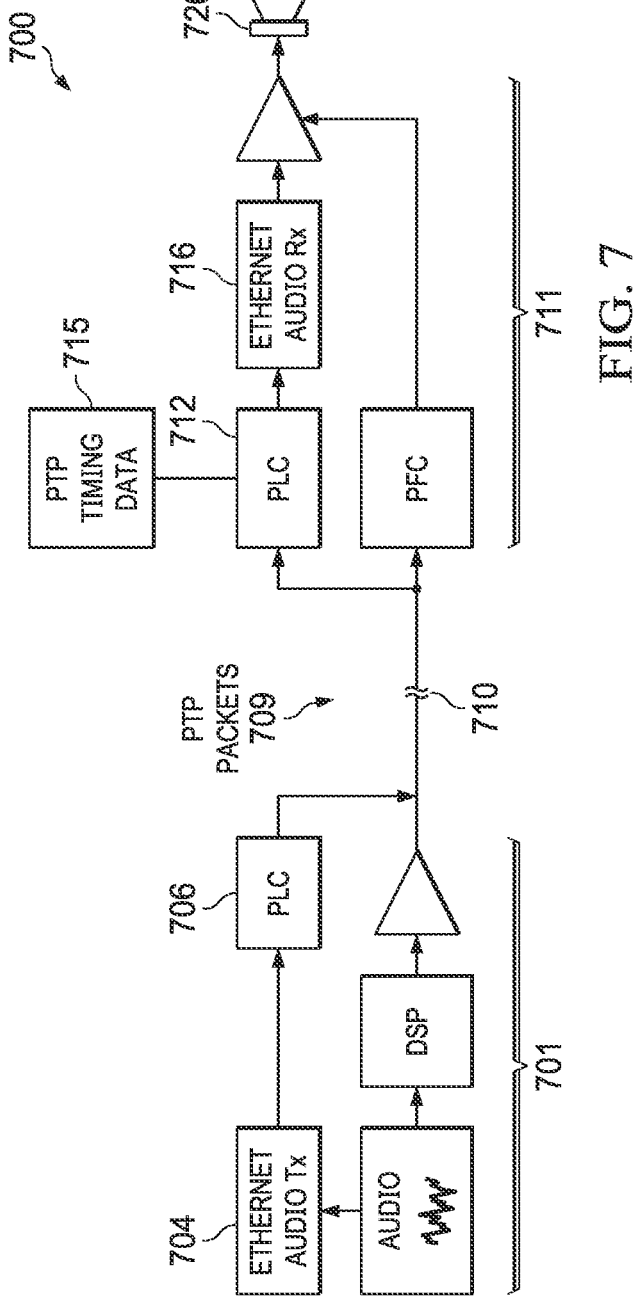
FIG. 7 illustrates an end-point audio clock synchronization system using precision time protocol (PTP) updates, under some embodiments.

FIG. 7 illustrates an end-point audio clock synchronization system using PTP updates, under some embodiments. The approach of system 700 uses PTP packets 709 utilized by the IEEE1588 standard of the AES67 format. System 700 comprises a source circuit 701 with the audio source generating packetized Ethernet signals for transmission over conductor 710 to end-point 711 for playback through speaker 720, as described above with respect to FIG. 4. For this embodiment, source 701 transmits audio data in the form of PTP packets 709 to the down-stream endpoint 711. The PLC receiver 712 maintains certain PTP timing data 715. Using this information, the end-point receiver 711 adjusts and re-timestamps the PTP packetized clock information 709 based upon the symbol timing information known within the PLC receiver. The PTP timing data comprises accurate timing information for its inbound symbols. Said differently, the PLC receiver is configured to monitor timing of PLC encoded symbols to adjust and to re-timestamp the PTP packets.

The end-point PLC 712 measures and provides symbol latency and symbol-to-symbol jitter performance, and then adjusts and/or re-timestamp each PTP packet to accommodate for the PLC's time varying latency and jitter aspects. Once the PTP packets are adjusted to accommodate for PLC latency and jitter, the end-point Ethernet audio receiver 716 utilizes its existing PTP clock synchronization schemes to accurately synchronize the end-point clock to that of the source Ethernet audio transmitter 704. For this embodiment, the PLC receiver 712 monitors symbol timing parameters that would be used by subsequent re-timing algorithms to correct the PTP packets as needed. Similar to the embodiment described above, the PLC receiver can monitor the symbol-to-symbol latency, delay, and nominal jitter performance of the physical layer (the loudspeaker cabling), the PLC receiver can pass this time skew information to the PTP algorithm, wherein the clock and audio frame recovery algorithms can be re-aligned to the transmitter. It should be noted that in this embodiment, the clock recovery scheme uses packet-based recovery (e.g., PTP), and then adjusts the recovered clock packets to achieve alignment and synchronization, in contrast to the embodiment described above, which uses the inherent PLC clock synchronization infrastructure to achieve synchronization. The master clock is the primary high frequency time-base that is used to maintain phase coherency between all digital devices within the system. The master clock may typically operate at a frequency of 12-100 MHz. In audio systems the master clock may operate at a frequency multiple of the frequency of an audio sample. For example, if the the frequency of an audio sample rate is 48 kHz, the master could operate at a frequency of 24.576 MHz, which is 512 times the frequency of the audio sample. The PTP method described above can be regarded as a method of transmitting and recovering the audio sample clock over a time-variant physical layer (like Ethernet). The packetized data may incur varying delays as the packets move through a traditional time-variant physical layer, like Ethernet (i.e. through hubs/switches/routers). Typically, in conventional systems, the varying delays (and jitter) of a traditional Power-line Communication (PLC) physical layer cause that the PTP system is unable to recover the audio sample clock, and thus PTP transmission via a PLC physical layer doesn't work properly. In order to solve this problem, in the PTP method of this disclosure, the PLC physical layer devices (i.e. the PLC transmitter and the PLC receiver) are synchronized by the master clock and the PLC receiver monitors the latency and jitter of the inbound PLC encoded data (e.g. the PLC symbols being transmitted over the physical power line). After that the PLC receiver can utilize this timing information (e.g. the PLC symbol latency and jitter), to adjust the timing of the PTP packets and to re-timestamp them. This ensures that the PTP packets are properly clocked without gaps and drop outs such that an audio stream can be properly played back.

Figure 8:
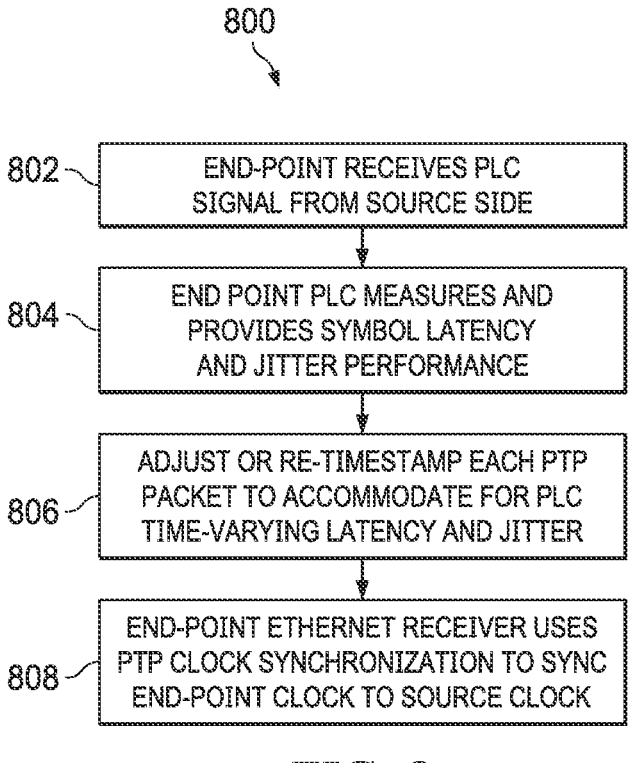
FIG. 8 is a flowchart that illustrates a method of providing end-point audio clock synchronization through a PLC PTP update, under some embodiments.

FIG. 8 is a flowchart that illustrates a method of providing end-point audio clock synchronization through a PLC PTP update, under some embodiments. As shown in FIG. 8, process 800 begins with the end-point receiving the PLC signal from the source side, 802. The end-point PLC receiver measures and provides symbol latency and symbol-to-symbol jitter performance using its internal clock recovery and symbol timing monitoring algorithms, 804. A down-stream algorithm then adjusts or re-timestamps each PTP packet to accommodate for the PLC's time varying latency and jitter aspects, 806. This algorithm would change the PTP packet time stamp to adjust for the symbol latency as measured over the nominal physical layer, and can be executed within the Ethernet audio receiver integrated circuit or programmable logic device. Once the PTP packets are adjusted to accommodate for PLC latency and jitter, the end-point Ethernet audio receiver utilizes its existing PTP clock synchronization schemes to accurately synchronize the end-point clock to that of the master (source) transmitter, 808. This embodiment requires the PLC receiver in the end-point to monitor symbol timing parameters that would be used by subsequent re-timing algorithms to correct the PTP packets as needed.

This embodiment PLC PTP update embodiment may be used in conjunction with the master clock transmission/recovery/synchronization scheme described in FIG. 6. Thus, the signal received in step 802 by the end-point may be the standard audio/power signal transmitted along conductor 410, as shown in FIG. 4, or it may be a master clocked signal as shown in FIG. 5.

Embodiments may be used to playback any appropriate type of audio format including stereo, surround-sound, object-based audio, or spatial (immersive) audio content. An example immersive audio system and associated audio format is the Dolby Atmos platform. Such a system incorporates a height (up/down) dimension that may be implemented as a 5.1, 7.1, 9.1 surround system, or similar surround sound configuration (e.g., 11.1, 13.1, 19.4, etc.). In general, these speakers may be used to produce sound that is designed to emanate from any position more or less accurately within the listening environment. Immersive audio can be used in a wide variety of venues including cinemas, auditoriums, homes, and so on. The end-point speakers may thus be placed in any appropriate location and distance from the audio source. Such speakers may also be implemented in any appropriate configuration, such as single or multi-way speakers, soundbars, standing or bookcase speakers, LFE (low-frequency effect) speakers, height speakers, and so on.

Embodiments can also be used in any appropriate power line (AC mains) infrastructure. In home applications, the direct amplification system may enable multi-channel audio distribution through a house without burdening Wi-Fi or other wireless infrastructures. Because most powered loudspeakers require some connection to AC mains, the reliable transmission of audio could be directly realized without additional audio signal wiring. Embodiments of the direct amplification audio system described herein may thus be used in any appropriate venue or application, such as cinema, home cinema, live venue, auditorium, industrial facility, military facility, theme park, and so on.

Although example implementations are described with respect to certain specified components, such as the Dolby Cinema Processor CP850, it should be noted that embodiments are not so limited and any similar or other appropriate component may be used.

Unless the context clearly requires otherwise, throughout the description and the claims, the words "comprise," "comprising," and the like are to be construed in an inclusive sense as opposed to an exclusive or exhaustive sense. Words using the singular or plural number also include the plural or singular number respectively. When the word "or" is used in reference to a list of two or more items, that word covers all of the following interpretations of the word: any of the items in the list, all of the items in the list and any combination of the items in the list.

While one or more implementations have been described by way of example and in terms of the specific embodiments, it is to be understood that one or more implementations are not so limited. The description is intended to cover various modifications and similar arrangements as would be apparent to those skilled in the art. Therefore, the scope of the appended claims should be accorded the broadest interpretation so as to encompass all such modifications and similar arrangements.

Various aspects of the present invention may be appreciated from the following enumerated example embodiments (EEEs):

EEE1. A distributed amplifier audio speaker system comprising:

an audio source transmitting audio and power over a common conductor to a plurality of end-points, each having a speaker to playback the audio, wherein the audio source comprises an Ethernet audio transmitter coupled to a power line communication (PLC) transmitter and a master clock coupled to and generating a master clock signal for both the Ethernet audio transmitter and PLC transmitter, wherein the PLC transmitter generates a PLC encoded signal comprising the power and audio to the plurality of endpoints; and an end-point of the plurality of endpoints receiving the PLC encoded signal, wherein the end-point comprises a PLC receiver coupled to an Ethernet receiver coupled to a speaker, wherein the PLC receiver recovers the master clock signal from the PLC encoded signal to synchronize the Ethernet receiver to the Ethernet transmitter.

EEE2. The system of EEE 1 wherein the PLC encoded signal comprises PLC telemetry information including PLC symbol latency and jitter, and wherein the end-point further adjusts the recovered master clock signal to align with an audio sample stream of the transmitted audio.

EEE3. The system of EEE 2 wherein the power comprises an audio band power signal encoded in a first frequency spectrum range and the audio sample stream is encoded in a second frequency spectrum range separated from the first frequency spectrum range by a defined minimum frequency difference.

EEE4. The system of EEE 1 wherein the Ethernet audio transmitter utilizes one of an AES67 or CobraNet Ethernet audio format.

EEE5. The system of EEE 4 wherein the PLC encoded signal comprises one of a Homeplug AV2, ITU-T, G.HN, or IEEE1901-2010 transmission standard.

EEE6. The system of any of EEEs 1 to 5 wherein each endpoint of the plurality of endpoints comprises a dedicated amplifier closely coupled to a respective speaker for playback of at least one audio component of the transmitted audio signal.

EEE7. The system of any of EEEs 1 to 6 wherein the dedicated amplifier is configured to demodulate and decode an audio channel of the transmitted audio and recover a power signal from the transmitted power to drive the respective speaker.

EEE8. The system of EEE 7 wherein the audio source is coupled to the endpoint over a two-conductor loudspeaker wire.

EEE9. The system of any of EEEs 1 to 8 further comprising a control unit comprising a multi-channel digital audio transceiver and an audio signal generator coupled to a Class-D amplifier transmitting the audio and power to the plurality of endpoints, and wherein the audio comprises at least one of stereo, surround-sound, object-based, or immersive audio content, wherein the immersive audio content comprises both object-based and channel-based audio components.

EEE10. A method of synchronizing timing of an audio source and a plurality of endpoints each having a speaker for playback of audio content, comprising:

providing a single master clock in an Ethernet transmitter of the audio source side;

synchronizing the master clock with an Ethernet transmitter with a Power-Line Communications (PLC) modulator of the audio source;

transmitting the synchronized PLC signal to an end-point of the plurality of endpoints over a common connector;

receiving, in a PLC demodulation receiver of an endpoint, the PLC signal;

recovering the master clock from the received PLC signal; and providing the recovered master clock signal to an Ethernet audio receiver in the endpoint to synchronize the Ethernet transmitter's clock with the Ethernet receiver of the end-point.

EEE11. The method of EEE 10 wherein the PLC signal comprises PLC telemetry information including PLC symbol latency and jitter, and wherein the method further comprises: adjusting, in the end-point, the recovered master clock to align with an audio sample stream transmitted by the audio source to the plurality of endpoints.

EEE12. The method of EEE 11 wherein the power comprises an audio band power signal encoded in a first frequency spectrum range and the audio sample stream is encoded in a second frequency spectrum range separated from the first frequency spectrum range by a defined minimum frequency difference.

EEE13. The method of any of EEEs 10 to 12 wherein the Ethernet audio transmitter utilizes one of an AES67 or CobraNet Ethernet audio format, and further wherein the PLC encoded signal comprises one of a Homeplug AV2, ITU-T, G.HN, or IEEE1901-2010 transmission standard.

EEE14. The method of any of EEEs 10 to 13 wherein each endpoint of the plurality of endpoints comprises a dedicated amplifier closely coupled to a respective speaker for playback of at least one audio component of an audio signal transmitted by the audio source, and wherein the dedicated amplifier is configured to demodulate and decode an audio channel of the transmitted audio and recover a power signal from the transmitted power to drive the respective speaker.

EEE15. A distributed amplifier audio speaker system comprising:

an audio source transmitting audio and power over a common conductor to a plurality of end-points, each having a speaker to playback the audio, wherein the audio source comprises an Ethernet audio transmitter coupled to a Power Line Communications (PLC) transmitter and a master clock coupled to and generating a master clock signal for both the Ethernet audio transmitter and PLC transmitter, wherein the PLC transmitter generates a PLC encoded signal comprising the power and audio to the plurality of endpoints;

a Precision Time Protocol (PTP) component transmitting the PLC encoded signal using PTP signal components; and an end-point of the plurality of endpoints receiving the PLC encoded signal and PTP signal components, wherein the end-point comprises a PLC receiver coupled to an Ethernet receiver coupled to a speaker, wherein the PLC receiver maintains certain PTP timing data and uses this data to adjust and re-timestamps the PTP packetized clock information received from the audio source and PTP component to compensate for any latency or jitter in the transmitted audio signal.

EEE16. The system of EEE 15 wherein the end-point further monitors symbol timing parameters in the transmitted audio signal and uses one or more re-timing algorithms to correct received PTP packets to achieve a minimum level of clock synchronization between the audio source and the end-point.

EEE17. The system of any of EEEs 15 to 16 wherein the PTP packets conform to the IEEE1588 standard of the AES67 format.

EEE18. The system of EEE 15 wherein each endpoint of the plurality of endpoints comprises a dedicated amplifier closely coupled to a respective speaker for playback of at least one audio component of the transmitted audio signal.

EEE19. The system of any of EEEs 15 to 18 wherein the power comprises an audio band power signal encoded in a first frequency spectrum range and the audio sample stream is encoded in a second frequency spectrum range separated from the first frequency spectrum range by a defined minimum frequency difference.

EEE20. The system of any of EEEs 15 to 19 wherein the dedicated amplifier is configured to demodulate and decode an audio channel of the transmitted audio and recover a power signal from the transmitted power to drive the respective speaker.

The invention claimed is:

1. A distributed audio speaker system comprising an audio source and a plurality of end-points, each end-point of the plurality of end-points having a speaker configured to playback the audio, an Ethernet receiver coupled to the speaker, and a power line communication (PLC) receiver coupled to the Ethernet receiver, wherein the audio source is configured to transmit the audio and the power over the common conductor to the plurality of end-points, and wherein the audio source comprises a power supply for generating the power, a PLC transmitter coupled to an output of the power supply, an Ethernet audio transmitter coupled to the PLC transmitter, and a master clock coupled to the PLC transmitter and the Ethernet audio transmitter, wherein the master clock is configured to generate a master clock signal for both the Ethernet audio transmitter and PLC transmitter, wherein the PLC transmitter is configured to generate a PLC encoded signal comprising the audio and to transmit the PLC encoded signal over the common conductor, wherein an end-point of the plurality of endpoints is configured to receive the PLC encoded signal and the power, wherein the PLC receiver of the end-point is configured to recover the master clock signal from the PLC encoded signal to synchronize the Ethernet receiver of the end-point to the Ethernet transmitter of the audio source, wherein the PLC encoded signal comprises PLC telemetry information including PLC symbol latency and jitter, and wherein the end-point is configured to further adjust the recovered master clock signal to align with an audio sample stream of the transmitted PLC encoded signal using the telemetry information.

2. The system of claim 1, wherein the power comprises an audio band power signal encoded in a first frequency spectrum range and the audio sample stream is encoded in a second frequency spectrum range separated from the first frequency spectrum range by a defined minimum frequency difference.

3. The system of claim 1, wherein the Ethernet audio transmitter utilizes one of an AES67 or CobraNet Ethernet audio format, and wherein the PLC encoded signal comprises one of a Homeplug AV2, ITU-T, G.HN, or IEEE1901-2010 transmission standard.

4. The system of claim 1, wherein each endpoint of the plurality of endpoints comprises a dedicated amplifier closely coupled to a respective speaker for playback of at least one audio component of the transmitted audio, and wherein the dedicated amplifier is configured to demodulate and decode an audio channel of the transmitted PLC encoded signal and recover a power signal from the transmitted power to drive the respective speaker, and further wherein the audio source is coupled to the endpoint over a two-conductor loudspeaker wire.

5. The system of claim 1, further comprising a control unit comprising a multi-channel digital audio transceiver and an audio signal generator coupled to a Class-D amplifier transmitting the audio and power to the plurality of endpoints, and wherein the audio comprises at least one of stereo, surround-sound, object-based, or immersive audio content, wherein the immersive audio content comprises both object-based and channel-based audio components.

6. A method of synchronizing timing of an audio source and a plurality of endpoints each having a speaker for playback of audio, an Ethernet receiver coupled to the speaker, and a power line communication (PLC) receiver coupled to the Ethernet receiver, wherein the audio source is configured to transmit audio and power over a common conductor to the plurality of end-points, wherein the audio source comprises a power supply for generating the power, a PLC transmitter coupled to an output of the power supply, an Ethernet audio transmitter coupled to the PLC transmitter, and a master clock coupled to the PLC transmitter and the Ethernet audio transmitter; wherein the method comprises:

generating, by the power supply, the power, generating, by the PLC transmitter, a PLC encoded signal comprising the audio, generating, by the master clock, a master clock signal for both the Ethernet audio transmitter and PLC transmitter;

synchronizing, using the master clock signal, the Ethernet transmitter with the PLC transmitter;

transmitting, by the PLC transmitter, the PLC encoded signal to an end-point of the plurality of endpoints over the common conductor;

receiving, by the PLC receiver of the end-point, the encoded signal;

recovering, by the PLC receiver, the master clock signal from the received signal; and providing the recovered master clock signal to the Ethernet audio receiver of the endpoint to synchronize the Ethernet transmitter of the audio source with the Ethernet receiver of the end-point; wherein the PLC signal comprises PLC telemetry information including PLC symbol latency and jitter, and wherein the method further comprises adjusting, in the end-point, the recovered master clock signal using the PLC telemetry information to align with an audio sample stream transmitted by the audio source to the plurality of endpoints.

7. The method of claim 6 wherein the power comprises an audio band power signal encoded in a first frequency spectrum range and the audio sample stream is encoded in a second frequency spectrum range separated from the first frequency spectrum range by a defined minimum frequency difference.

8. The method of claim 6, wherein the Ethernet audio transmitter utilizes one of an AES67 or CobraNet Ethernet audio format, and further wherein the PLC encoded signal comprises one of a Homeplug AV2, ITU-T, G.HN, or IEEE1901-2010 transmission standard.

9. The method of claim 6, wherein each endpoint of the plurality of endpoints comprises a dedicated amplifier closely coupled to a respective speaker for playback of at least one audio component of the audio transmitted by the audio source, and wherein the dedicated amplifier is configured to demodulate and decode an audio channel of the transmitted PLC encoded signal and recover a power signal from the transmitted power to drive the respective speaker.

10. A distributed audio speaker system comprising an audio source, a plurality of end-points, each end-point of the plurality of end-points having a speaker configured to playback the audio, an Ethernet receiver coupled to the speaker, and a power line communication (PLC) receiver coupled to the Ethernet receiver, wherein the audio source is configured to transmit audio and power over a common conductor to the plurality of end-points, wherein the audio source comprises a power supply for generating the power, a PLC transmitter coupled to an output of the power supply, an Ethernet audio transmitter coupled to the PLC transmitter and a master clock coupled to both the Ethernet audio transmitter and the PLC transmitter and configured to generate a master clock signal for both the Ethernet audio transmitter and PLC transmitter, wherein the PLC transmitter is configured to generate a PLC encoded signal comprising the audio and to transmit the PLC encoded signal over the common conductor, wherein the audio comprises precision time protocol (PTP) audio packets; and an end-point of the plurality of endpoints configured to receive the PLC encoded signal comprising the PTP packets, wherein the PLC receiver of the end-point is configured to monitor timing of PLC encoded symbols of the PLC encoded signal to adjust and to re-timestamp the PTP packets received from the audio source for compensating for any latency or jitter in the transmission of the PLC encoded signal.

11. The system of claim 10, wherein the PLC receiver of the end-point is configured to monitor symbol timing parameters in the transmitted PLC encoded signal and to use one or more re-timing algorithms to correct the received PTP packets to achieve a minimum level of clock synchronization between the audio source and the end-point, and wherein the PTP packets conform to the IEEE1588 standard of the AES67 format.

12. The system of claim 10, wherein each endpoint of the plurality of endpoints comprises a dedicated amplifier closely coupled to a respective speaker for playback of at least one audio component of the transmitted audio signal.

13. The system of claim 10, wherein the power comprises an audio band power signal encoded in a first frequency spectrum range and the audio sample stream is encoded in a second frequency spectrum range separated from the first frequency spectrum range by a defined minimum frequency difference.

14. The system of claim 10, wherein the dedicated amplifier is configured to demodulate and decode an audio channel of the transmitted audio and recover a power signal from the transmitted power to drive the respective speaker.

\* \* \* \* \*